United States Patent
Haucke

(10) Patent No.: US 8,262,040 B1
(45) Date of Patent: Sep. 11, 2012

(54) SWAY BAR STORAGE BRACKET

(76) Inventor: William Haucke, Payson, AZ (US)

(*) Notice: Subject to any disclaimer, the term of this patent is extended or adjusted under 35 U.S.C. 154(b) by 294 days.

(21) Appl. No.: 12/660,827

(22) Filed: Mar. 4, 2010

Related U.S. Application Data

(60) Provisional application No. 61/212,266, filed on Apr. 9, 2009.

(51) Int. Cl.
*A47F 96/06* (2006.01)
*B60D 1/32* (2006.01)

(52) U.S. Cl. ............ 248/215; 248/227.1; 248/340; 280/455.1

(58) Field of Classification Search .... 248/227.1–227.2, 248/227.4, 214, 215, 224.14, 339–340; 480/490.1, 480/502, 503, 511, 457, 477, 483, 455.1, 480/406.1, 495, 474, 484; 224/509
See application file for complete search history.

(56) References Cited

U.S. PATENT DOCUMENTS

| | | | | |
|---|---|---|---|---|
| 3,110,507 A * | 11/1963 | Riner | ............. | 280/422 |
| 3,921,726 A * | 11/1975 | Connor et al. | ............. | 172/646 |
| 4,029,155 A * | 6/1977 | Blair et al. | ............. | 172/763 |
| 4,577,568 A * | 3/1986 | Netsch | ............. | 172/253 |
| 5,335,735 A * | 8/1994 | Hake | ............. | 172/707 |
| 5,806,737 A * | 9/1998 | Clark | ............. | 224/509 |
| 6,230,375 B1 * | 5/2001 | Catlett | ............. | 24/599.8 |
| 7,556,229 B2 * | 7/2009 | Elliott et al. | ............. | 248/230.1 |

* cited by examiner

*Primary Examiner* — Tan Le

(57) ABSTRACT

A sway bar storage bracket for storing a sway bar usable on an equalizer trailer hitch system between a trailer and a towing vehicle is provided. The trailer hitch system has equalizer hardware. The sway bar storage bracket comprises an elongated middle section having a first end and a second end, a first extension section having a first end and a second end with the first end of the first extension section being connected to the first end of the middle section, a second extension section having a first end and a second end with the first end of the second extension section being connected to the second end of the middle section, a first member having a first end and a second end with the first end of the first member being connected to the first end of the first extension section, and a second member having a first end and a second end with the first end of the second member being connected to the second end of the second extension section. A tightening mechanism releasably secures the sway bar storage bracket to the trailer tongue. A holding mechanism releasably holds the sway bar to the sway bar storage bracket wherein the sway bar is positionable between the sway bar storage bracket and the equalizer hardware thereby releasably storing the sway bar when not in use.

19 Claims, 3 Drawing Sheets

SWAY BAR STORAGE BRACKET

The present application claims the benefit of priority of pending provisional patent application Ser. No. 61/212,266, filed on Apr. 9, 2009, entitled "Sway Bar Storage Bracket".

BACKGROUND OF THE INVENTION

1. Field of the Invention

This invention relates generally to a sway bar storage bracket and, more particularly, the invention relates to a sway bar storage bracket for storing the sway bars found on equalizer trailer hitches.

2. Description of the Prior Art

A device that is frequently seen attached to the rear bumper of various types of vehicles is a hitch; a metal assembly used for towing boats, campers, self-contained tents, and similar two wheeled vehicles. The trailer hitch device attached to the vehicle that performs the towing is referred to as a receiver, or receptacle. This name is derived from the fact that the metal towing mechanism positioned on the item being towed is fitted into the opening on the metal device secured to the towing vehicle, the device functioning as a 'receiver' or 'receiving receptacle'.

There are numerous types of hitches, the most common being the 'ball over' and 'ball under' types and the hitch attachment that uses a bolt and nut attachment method. When towing a trailer with a standard ball mount, all of the trailer's tongue weight is transferred to the tow vehicle. Since the trailer hitch is attached to the vehicle frame, the additional weight in the rear will lower the back end of the vehicle while raising the front end. This means the rear axle will be handling not only the trailer tongue weight but also an additional load as weight is transferred from the front axle. Less weight on the front axle can lead to performance decreases in steering, traction, and stopping while also increasing trailer sway.

A popular accessory to the weight distribution system is the sway control bar. Trailer sway can be caused by cross winds, poor trailer loading (load too far back), or not enough spring bar tension. The use of a weight distributing hitch by itself will help improve trailer sway, but sway bars help eliminate it.

SUMMARY

The present invention is a sway bar storage bracket for storing a sway bar usable on an equalizer trailer hitch system between a trailer and a towing vehicle. The trailer hitch system has equalizer hardware. The sway bar storage bracket comprises an elongated middle section having a first end and a second end, a first extension section having a first end and a second end with the first end of the first extension section being connected to the first end of the middle section, a second extension section having a first end and a second end with the first end of the second extension section being connected to the second end of the middle section, a first member having a first end and a second end with the first end of the first member being connected to the second end of the first extension section, and a second member having a first end and a second end with the first end of the second member being connected to the second end of the second extension section. A tightening mechanism releasably secures the sway bar storage bracket to the trailer tongue. A holding mechanism releasably holds the sway bar to the sway bar storage bracket wherein the sway bar is positionable between the sway bar storage bracket and the equalizer hardware thereby releasably storing the sway bar when not in use.

The present invention further includes a method for storing a sway bar usable on an equalizer trailer hitch system between a trailer and a towing vehicle. The trailer hitch system has equalizer hardware. The method comprises providing an elongated middle section having a first end and a second end, providing a first extension section having a first end and a second end, connecting the first end of the first extension section to the first end of the middle section, providing a second extension section having a first end and a second end, connecting the first end of the second extension section to the second end of the middle section, providing a first member having a first end and a second end, connecting the first end of the first member to the first end of the first extension section, providing a second member having a first end and a second end, connecting the first end of the second member to the second end of the second extension section, releasably securing the sway bar storage bracket to the trailer tongue, and releasably holding the sway bar to the sway bar storage bracket.

DETAILED DESCRIPTION OF THE PREFERRED EMBODIMENTS

Figure 2:
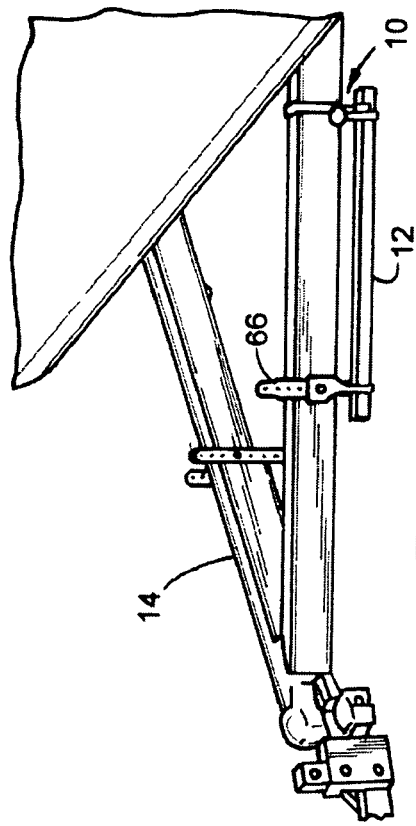
FIG. 2 is another perspective view illustrating the sway bar storage bracket, constructed in accordance with the present invention.
Figure 3:
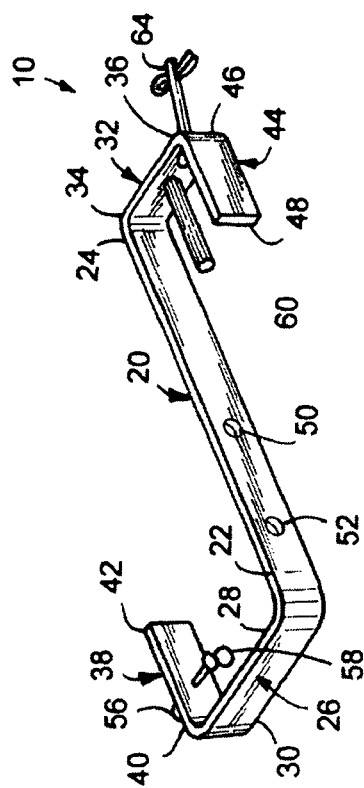
FIG. 3 is still another perspective view illustrating the sway bar storage bracket, constructed in accordance with the present invention.
Figure 1:
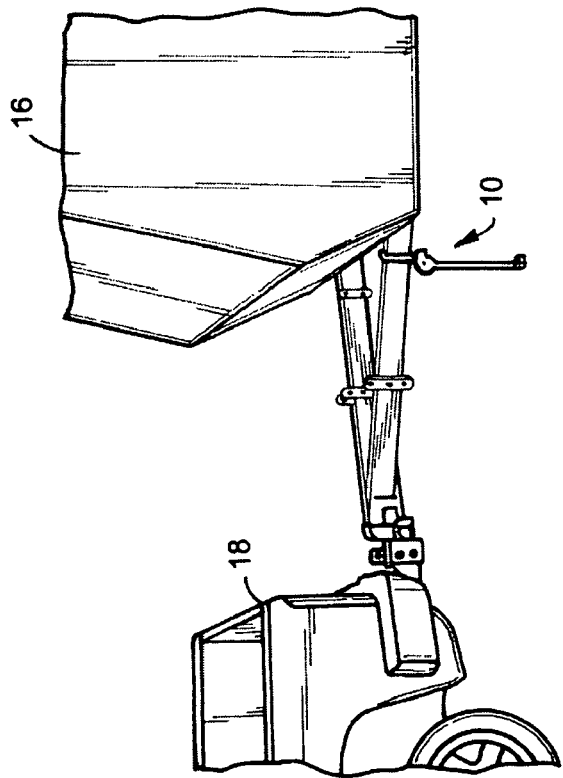
FIG. 1 is a perspective view illustrating a sway bar storage bracket, constructed in accordance with the present invention.
Figure 5:
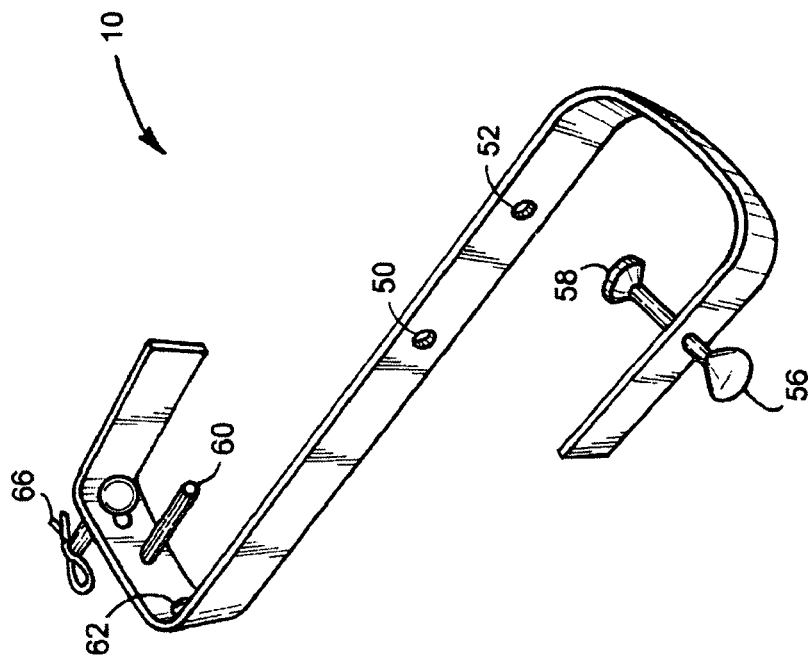
FIG. 5 is still yet another perspective view illustrating the sway bar storage bracket, constructed in accordance with the present invention.
Figure 4:
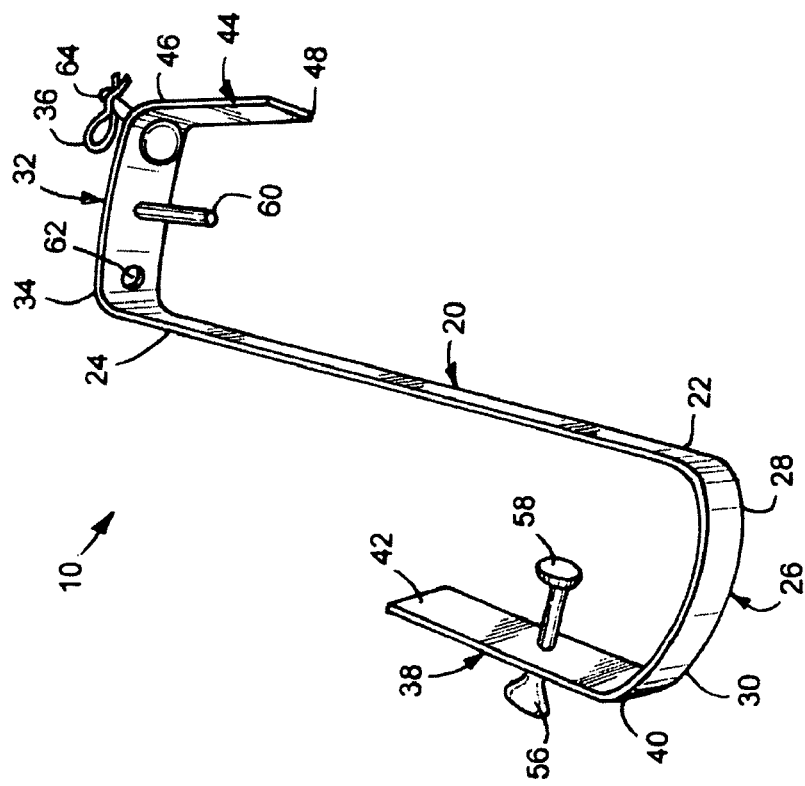
FIG. 4 is yet another perspective view illustrating the sway bar storage bracket, constructed in accordance with the present invention.
Figure 6:
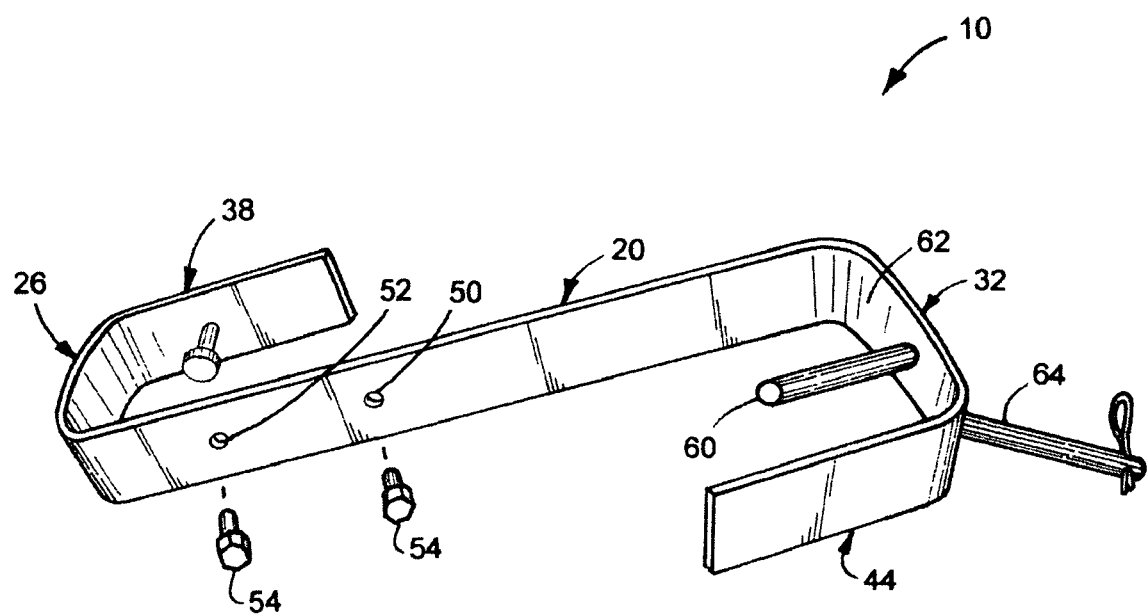
FIG. 6 is a further perspective view illustrating the sway bar storage bracket, constructed in accordance with the present invention.

As illustrated in FIGS. 1-6, the present invention is a sway bar storage bracket, indicated generally at 10, for storing sway bars 12 used on equalizer trailer hitch systems 14 between a trailer 16 and a towing vehicle 18. Trailer hitch systems 14 typically extend from the front of the trailer 16 allowing the trailer 16 to be towed by the towing vehicle 18. A pair of sway bars 12, one on each side, is typically positioned between the trailer 16 and the towing vehicle 18 to reduce the swaying motion of the trailer 16 during travel. With the sway bar storage bracket 10 of the present invention, users will have a simple and effective means of managing the sway bars 12 when it is not in use.

The sway bar storage bracket 10 of the present invention is preferably constructed of a durable metal material. It should be noted, however, that while the sway bar storage bracket 10 has been and will be described as being constructed of a metal material, it is within the scope of the present invention for the sway bar storage bracket 10 to be constructed of a different durable material depending on the desires of the manufacturer and the user.

The sway bar storage bracket 10 of the present invention has a substantially S-shape configuration comprising an elongated middle section 20 having a first end 22 and a second end 24. The middle section 20 is preferably approximately eleven (11") inches in length although having a middle section 20 greater than or less than approximately eleven (11") inches in length is within the scope of the present invention.

In addition, the sway bar storage bracket 10 of the present invention has a first extension section 26 having a first end 28 and a second end 30 and a second extension section 32 having a first end 34 and a second end 36. The first end 28 of the first extension section 26 is connected to the first end 22 of the middle section 20 at an approximately ninety (90°) angle to the middle section 20 and the first end 34 of the second extension section 32 is connected to the second end 24 of the middle section 20 at an approximately ninety (90°) angle to the middle section 20. The length of each extension section 26, 32 is preferably approximately three (3") inches giving the sway bar storage bracket 10 a depth of approximately six (6") inches. It should be noted that it is within the scope of the present invention for the extension sections 26, 32 to have a length greater than or less than three (3") inches.

The sway bar storage bracket 10 of the present invention further has a first member 38 having a first end 40 and a second end 42 and a second member 44 having a first end 46 and a second end 48. The first end 40 of the first member 38 is connected to the second end 30 of the first extension section 26 at an approximately ninety (90°) angle to the first extension section 26 and the first end 46 of the second member 44 is connected to the second end 36 of the second extension section 32 at an approximately ninety (90°) angle to the second extension section 32. The length of each member 38, 44 is preferably less than the length of each extension section 26, 32 although it is within the scope of the present invention for the length of each member 38, 44 to be equal to or greater than the length of the extension sections 26, 32.

The middle section 20, the extension sections 26, 32, and the members 38, 44 of the sway bar storage bracket 10 of the present invention preferably have a width of approximately one (1") inch in width. The entire sway bar storage bracket 10 is preferably constructed from a single piece of material although connecting the middle section 20, the extension sections 26, 32, and the members 38, 44 together by welding or the like is within the scope of the present invention.

The middle section 20 of the sway bar storage bracket 10 of the present invention has a pair of apertures formed therein. The first aperture 50 is positioned in the approximate center of the middle section 20 while the second aperture 52 is positioned between the first aperture 50 and the first end 22 of the middle section 20. A screw 54 or the like is insertable into each of the apertures 50, 52 for further securing the sway bar storage bracket 10 to the trailer tongue 14, if desired, as will be described in further detail below.

The first member 38 of the sway bar storage bracket 10 of the present invention further includes a thumbscrew 56 with tightening pad 58. When the combined first extension section 26 and the first member 38 is positioned upon the trailer tongue 14, the thumbscrew 56 is tightenable causing the tightening pad 58 to be forced against the trailer tongue 14 thereby releasably securing the sway bar storage bracket 10 to the trailer tongue 14. The screws 54 can be tightened through the first aperture 50 and the second aperture 52 into possible corresponding apertures on the trailer tongue 14, as described above, to further secure the sway bar storage bracket 10 to the trailer tongue 14 permanently, if desired.

The second extension member 32 of the sway bar storage bracket 10 of the present invention includes a metal pin 60 extending therefrom in the same general direction as the second member 44. Preferably the metal pin 60 is welded or otherwise reliably and securably attached to the second extension member 44. In operation, the metal pin 60 is inserted into an aperture of the sway bar 12 allowing the sway bar 12 to rest upon the pin 60 and thereby releasably hold the sway bar 12 in position.

At least one aperture 62 can be formed in the second extension member 32 of the sway bar storage bracket 10 of the present invention. Each of the apertures 62 is sized and shaped for receiving the hitch pin 64 and releasably storing the hitch pin 64 when the sway bar 12 is being stored in the sway bar storage bracket 10.

Configured to be used in conjunction with existing equalizer hardware 66, each sway bar storage bracket 10 of the present invention can be easily installed and put to use in a matter of minutes. One end of the sway bar 12 is attached to the existing equalizer hardware 66 as normal. The other end of the sway bar 12 is attached to the sway bar storage bracket 10, as described above, rather than the towing vehicle 18. As a result, consumers are able to quickly and expediently secure the sway bar 12 out of the way when it is not needed to prevent trailer sway. Additionally, users are able to eliminate greasy and dirty messes inside trailer compartments, as the sway bar storage bracket 10 stores the sway bar 12 at point of use.

Universal in design, the sway bar storage bracket 10 of the present invention can be utilized in conjunction with virtually any hitch assembly 14. Ideal for use by campers, boaters and others, the sway bar storage bracket serves 10 a variety of useful applications, with ease. Durably constructed of quality materials, the sway bar storage bracket 10 will withstand years of repeated use, with ease.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A sway bar storage bracket for storing a sway bar usable on an equalizer trailer hitch system between a trailer and a towing vehicle, the trailer hitch system having equalizer hardware, the sway bar storage bracket comprising:

an elongated middle section having a first end and a second end;

a first extension section having a first end and a second end, the first end of the first extension section being connected to the first end of the middle section;

a second extension section having a first end and a second end, the first end of the second extension section being connected to the second end of the middle section;

a first member having a first end and a second end, the first end of the first member being connected to the second end of the first extension section;

a second member having a first end and a second end, the first end of the second member being connected to the second end of the second extension section;

a thumb screw for releasably securing the sway bar storage bracket to the trailer tongue; and a metal pin for releasably holding the sway bar to the sway bar storage bracket, the metal pin extending from the second extension member in the same general direction as the second member, the metal pin insertable into an aperture of the sway bar allowing the sway bar to rest upon the pin and thereby releasably hold the sway bar in position;

wherein the sway bar is positionable between the sway bar storage bracket and the equalizer hardware thereby releasably storing the sway bar when not in use.

2. The sway bar storage bracket of claim 1 wherein the sway bar storage bracket has a substantially S-shape configuration.

3. The sway bar storage bracket of claim 1 wherein the first end of the first extension section is connected to the first end of the middle section at an approximately ninety (90°) angle to the middle section.

4. The sway bar storage bracket of claim 1 wherein the first end of the second extension section is connected to the second end of the middle section at an approximately ninety (90°) angle to the middle section.

5. The sway bar storage bracket of claim 1 wherein the first end of the first member is connected to the first end of the first extension section at an approximately ninety (90°) angle to the first extension section.

6. The sway bar storage bracket of claim 1 wherein the first end of the second member is connected to the second end of the second extension section at an approximately ninety (90°) angle to the second extension section.

7. The sway bar storage bracket of claim 1 wherein the sway bar storage bracket constructed from a single piece of material.

8. The sway bar storage bracket of claim 1 and further comprising:
a pair of apertures formed in the middle section; and
a screw insertable through each of the apertures into the trailer tongue for further securing the sway bar storage bracket to the trailer tongue.

9. The sway bar storage bracket of claim 8 and further comprising:
a first aperture positioned in the approximate center of the middle section; and
a second aperture positioned between the first aperture and the first end of the middle section;
wherein each aperture positionable for alignment with corresponding apertures formed in the trailer tongue.

10. The sway bar storage bracket of claim 1 wherein the thumbscrew is threadably positioned through the first member and a tightening pad tightenable against the trailer tongue.

11. The sway bar storage bracket of claim 1 and further comprising:
at least one aperture formed in the second extension member, the at least one aperture sized and shaped for receiving a hitch pin and releasably storing the hitch pin when the sway bar is being stored in the sway bar storage bracket.

12. A method for storing a sway bar usable on an equalizer trailer hitch system between a trailer and a towing vehicle, the trailer hitch system having equalizer hardware, the method comprising:
providing an elongated middle section having a first end and a second end;
providing a first extension section having a first end and a second end;
connecting the first end of the first extension section to the first end of the middle section;
providing a second extension section having a first end and a second end;
connecting the first end of the second extension section to the second end of the middle section;
providing a first member having a first end and a second end;
connecting the first end of the first member to the second end of the first extension section;
providing a second member having a first end and a second end;
connecting the first end of the second member to the second end of the second extension section;
releasably securing the sway bar storage bracket to the trailer tongue;
releasably holding the sway bar to the sway bar storage bracket with a metal pin;
extending the metal pin from the second extension member in the same general direction as the second member; and
inserting the metal pin into an aperture of the sway bar allowing the sway bar to rest upon the pin and thereby releasably holding the sway bar in position.

13. The method of claim 12 and further comprising:
connecting the first end of the first extension section to the first end of the middle section at an approximately ninety (90°) angle to the middle section; and
connecting the first end of the second extension section to the second end of the middle section at an approximately ninety (90°) angle to the middle section.

14. The method of claim 12 and further comprising:
connecting the first end of the first member to the first end of the first extension section at an approximately ninety (90°) angle to the first extension section; and
connecting the first end of the second member to the second end of the second extension section at an approximately ninety (90°) angle to the second extension section.

15. The method of claim 12 and further comprising:
forming a pair of apertures in the middle section; and
inserting a screw through each of the apertures into the trailer tongue for further securing the sway bar storage bracket to the trailer tongue.

16. The method of claim 12 and further comprising:
providing a thumb screw;
positioning the thumb screw through the first member;
securing a tightening pad to the thumb screw; and
tightening the tightening pad against the trailer tongue.

17. The method of claim 12 and further comprising:
extending a metal pin from the second extension member in the same general direction as the second member; and
inserting the metal pin into an aperture of the sway bar allowing the sway bar to rest upon the pin and thereby releasably hold the sway bar in position.

18. The method of claim 12 and further comprising:
forming at least one aperture formed in the second extension member;
inserting and releasably securing a hitch pin in the aperture.

19. A sway bar storage bracket for storing a sway bar usable on an equalizer trailer hitch system between a trailer and a towing vehicle, the trailer hitch system having equalizer hardware, the sway bar storage bracket comprising:
an elongated middle section having a first end and a second end;
a first extension section having a first end and a second end, the first end of the first extension section being connected to the first end of the middle section at an approximately ninety (90°) angle to the middle section;
a second extension second having a first end and a second end, the first end of the second extension section being connected to the second end of the middle section at an approximately ninety (90°) angle to the middle section;
a first member having a first end and a second end, the first end of the first member being connected to the first end of the first extension section at an approximately ninety (90°) angle to the first extension section;

a second member having a first end and a second end, the first end of the second member being connected to the second end of the second extension section at an approximately ninety (90°) angle to the second extension section;

a thumb screw for releasably securing the sway bar storage bracket to the trailer tongue; and a metal pin for releasably holding the sway bar to the sway bar storage bracket, the metal pin extending from the second extension member in the same general direction as the second member, the metal pin insertable into an aperture of the sway bar allowing the sway bar to rest upon the pin and thereby releasably hold the sway bar in position;

at least one aperture formed in the second extension member, the at least one aperture sized and shaped for receiving a hitch pin and releasably storing the hitch pin when the sway bar is being stored in the sway bar storage bracket;

wherein the sway bar storage bracket has a substantially S-shape configuration; and wherein the sway bar is positionable between the sway bar storage bracket and the equalizer hardware thereby releasably storing the sway bar when not in use.

* * * * *